(12) United States Patent
Li

(10) Patent No.: US 6,414,860 B1
(45) Date of Patent: Jul. 2, 2002

(54) CURRENT CONTROL START UP FOR PULSE-WIDTH MODULATED SYSTEMS

(75) Inventor: Kang Li, Windsor (CA)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 09/772,973

(22) Filed: Jan. 31, 2001

(51) Int. Cl.$^7$ .......................... H02M 1/14; H02H 7/122
(52) U.S. Cl. ...................... 363/49; 363/56.09; 323/901
(58) Field of Search ................................ 323/901, 908; 363/49, 56.01, 50, 56.09, 56.1

(56) References Cited

U.S. PATENT DOCUMENTS

| | | | | |
|---|---|---|---|---|
| 4,975,823 A | * | 12/1990 | Rilly et al. ..................... | 363/56 |
| 5,293,077 A | | 3/1994 | Seki et al. .................. | 307/10.8 |
| 5,343,382 A | * | 8/1994 | Hale et al. ..................... | 363/98 |
| 5,449,973 A | | 9/1995 | Yamashita et al. ............. | 315/82 |
| 5,528,132 A | * | 6/1996 | Doluca ........................ | 323/284 |
| 5,654,880 A | * | 8/1997 | Brkovic ....................... | 363/17 |
| 5,745,352 A | | 4/1998 | Sandri et al. .................. | 363/41 |
| 6,061,224 A | * | 5/2000 | Allen .......................... | 361/154 |
| 6,147,848 A | * | 11/2000 | Boggs et al. ............... | 361/93.2 |
| 6,242,898 B1 | * | 6/2001 | Shimizu et al. .............. | 323/313 |

* cited by examiner

*Primary Examiner*—Bao Q. Vu
(74) *Attorney, Agent, or Firm*—Sughrue Mion, PLLC

(57) ABSTRACT

A PWM current control circuit that determines whether a start-up time, during which an decreased current is being drawn, for a load has elapsed and providing a switch that supplies current to the load with a control signal that limits the current being drawn if the start-up time has not elapsed and providing a standard PWM control signal from a microcontroller if the start-up time has not elapsed. Excessive inrush current during the start-up period of the load is avoided while the current is maintained to be within a predetermined range during start-up and after the start-up time has elapsed the control is again turned over to the microcontroller.

18 Claims, 2 Drawing Sheets

CURRENT CONTROL START UP FOR PULSE-WIDTH MODULATED SYSTEMS

FIELD OF THE INVENTION

The present invention relates generally to a Pulse-Width Modulator (PWM) control circuit for controlling the electrical current level of a modulated output signal of a PWM circuit. More particularly, the invention relates to a circuit for controlling the current supplied to a load device, or devices, during a start-up period of the device(s) as well as subsequent to the start-up period.

BACKGROUND OF THE INVENTION

A PWM is a device that can provide the necessary drive signals required by various types of electronic devices. A PWM circuit works by generating a square wave with a variable ON/OFF ratio, the average ON time may be varied from 0 to 100 percent. In this manner, a variable amount of power is transferred to the device being driven.

A PWM voltage conversion system offers a relatively simple control algorithm, simple circuit structure and low cost. A PWM controller is typically configured to drive one or more main switches, such as a Field-Effect Transistors (FET), and provides a pulsed voltage signal to the transistor. When the pulsed voltage signal is in one state, i.e., a high state, the transistor is turned ON, allowing current to flow to the load. Alternatively, when the pulsed voltage signal is in another state, i.e., a low state, the transistor is turned OFF and current is prevented from flowing to the load. The ratio of ON time to signal period is referred to as the duty cycle of the drive signal. The duty cycle of the PWM drive signal, thus, determines the average amount of current and, hence, power supplied to the load.

For the most part, when designing a PWM drive circuit, the main consideration lies in the simplicity of the design. This is not necessarily the case, however, when the PWM converter is responsible for supplying power to, for example, tungsten filament lamps or DC motors.

In regard to tungsten filament lamps, due to the physical characteristics of tungsten, the resistance of the filament when it is cold is much smaller than its resistance when the tungsten is hot. Accordingly, during a start-up period, when the lamp is first energized and the filament is cold, the small cold resistance leads to a large inrush current in the filament. For example, in a situation where a 42/14 volt PWM converter is used, the inrush current to the filament could be 70 amps, due to the amplitude of the voltage pulses, i.e., 42 volts, as opposed to an inrush current of 25 amps for systems using a 14 volt PWM converter. The huge inrush current could significantly shorten the useful life of the lamp and may lead to big voltage fluctuations on the power bus.

Accordingly, in order to add usable life to filament lamps, there have been attempts to limit the inrush current to the filaments. One method provides a current control means to the conventional 42/14 volt PWM converter. According to this method, the inrush current can be limited to a level that is about the same as that in a 14 volt DC system, thereby assisting in prolonging the lifetime of the lamp.

A PWM is used to provide pulsed voltage or current to the switch driver. Compared to a DC system, during the start up period, the pulsed energy supplied by a PWM system in a unit time is smaller. The smaller power, however, introduces longer start up time, i.e., the time from the start of lamp energization until the lamp is fully illuminated. In some applications, i.e., automotive break lamps, a long start up time leads to a delay in the lamp providing whatever it is that it is intended to indicate. This condition is not acceptable for many applications and represents another significant drawback in conventional PWM conversion systems.

Similar drawbacks to the ones mentioned above for tungsten filament lamps occur when PWM converters are used to drive DC motors. For example, in a 42/14 volt system, where a 42 volt DC power supply and a 14 volt DC motor are used, the large voltage supplied from the power supply causes a large inrush current to flow in the motor. This large inrush current can cause a shock to the mechanical structures and/or large interference in the electrical systems associated with the motor. By limiting the output of the PWM converter in a similar fashion to the method for limiting the output for the lamp, discussed above, the start up of the motor is delayed, which can cause disastrous effects.

Therefore, a system whereby a low inrush current during start up is supplied and then control is returned to the PWM controller is desired.

SUMMARY OF THE INVENTION

In view of the aforementioned problems with the conventional approach to PWM converter control, the present invention comprises a simple control circuit that provides a short start up time for devices such as tungsten filament lamps and DC motors, provides a low, controlled, inrush current to these devices and, automatically detects the end of the start up period and returns control back to the PWM controller.

In order to achieve the main objective of the invention, a preferred embodiment in accordance with the present invention provides a device comprising a controller operable to receive input voltage signals and generate a PWM output signal in accordance with a predetermined duty-cycle, a current control device operable to receive the PWM output signal and generate a driver input signal. The current control device can further comprise a start-up detector operable to determine when a start-up time for the load has elapsed and a start-up time limit device operable to set up a start-up animate time and maintain the start-up detector in an operable state until the start-up animate time has elapsed. The device may also include a driver that receives the driver input signal and outputs a driver output signal that is a modified version of its input signal, and a switch device connected to the driver that can receive the driver output signal and supply power to the load in accordance with the driver output signal.

Prior to a start-up time being detected, a control signal from the controller is masked by a chopping signal that is synchronous with the current being drawn by the load as the current fluctuates between a minimum level and a maximum level. Thus, during the start-up time, the current drawn by the load is not permitted to exceed a certain amount. However, because the load is supplied with pulses of energy, wherein the level of the pulses are not reduced, as in the conventional art, the start-up time of the load is not significantly reduced. After the start-up time of the load has been reached, the controller is once again handed control and the standard PWM control signal generated by the controller is used to supply the load with current. Accordingly, a fast start-up time can be achieved without the detrimental effects of a large current being drawn through the load during start-up.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE PREFERRED EMBODIMENTS

Figure 1:
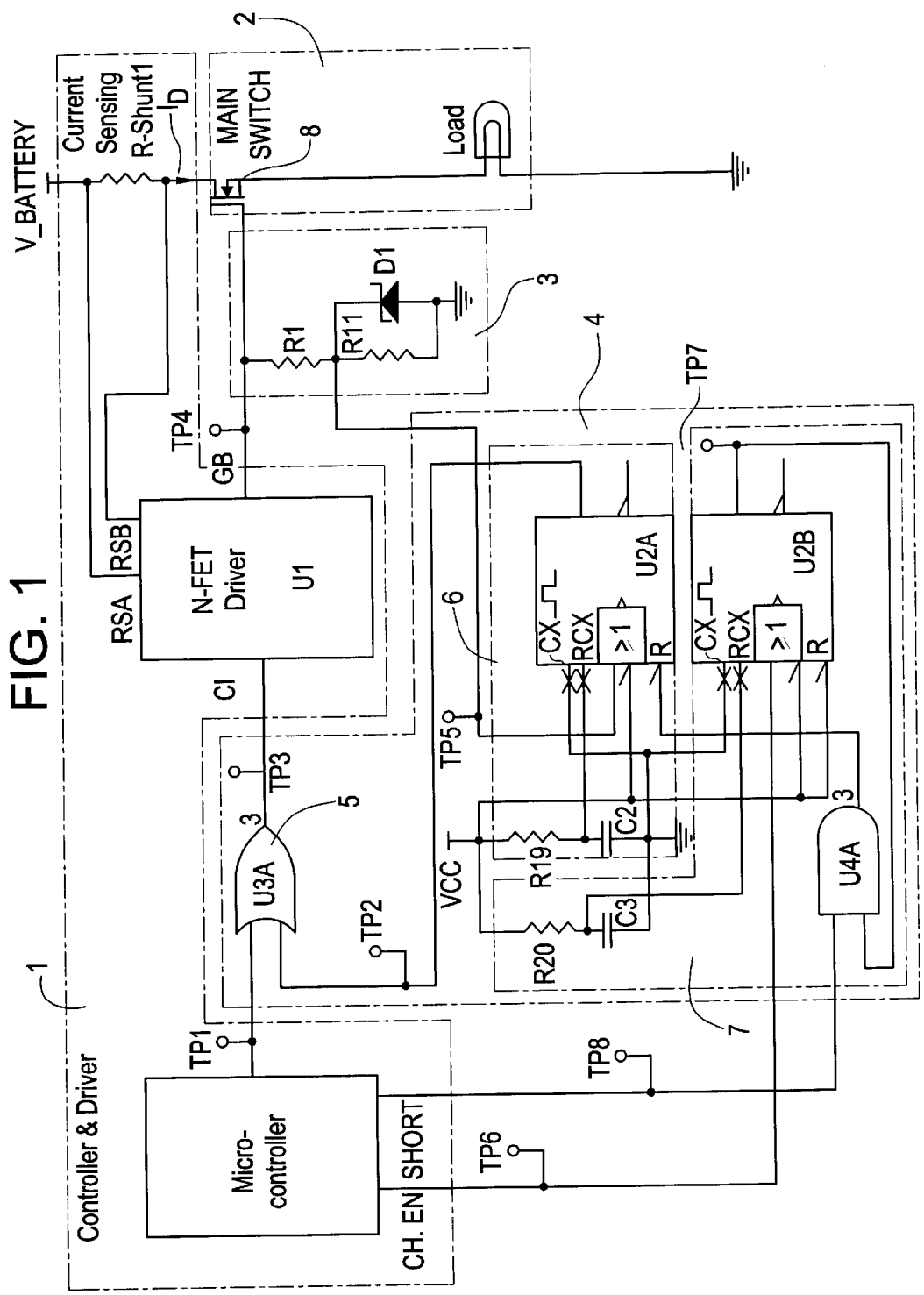
FIG. 1 is a circuit schematic illustrating the implementation of a preferred embodiment of the invention.

FIG. 1 illustrates a circuit in accordance with a preferred embodiment of the invention. The circuit shown in FIG. 1 comprises three main sections, a PWM controller 1, a current control circuit 4, and a collection of switches and loads 2. A current control start up PWM system in accordance with the present invention can be a single channel system, whereby one PWM control system circuit supplies drive signals to corresponding switches and loads, or it can be a multi-channel system, whereby several circuits similar to the one depicted in FIG. 1 provide drive signals to several switches and loads. In order to simplify the discussion, only a single channel system is shown in FIG. 1.

In FIG. 1, the PWM controller 1 comprises a microcontroller 9, a current sensor 10 and a switch driver 11. The PWM controller generates a PWM waveform in accordance with a predetermined frequency. The microcontroller 9 receives an input voltage signal and outputs a signal based on the input signal with a predetermined duty-cycle. The microcontroller can be any kind of suitable commercial product as long as it can compute duty cycle, generate PWM patterns and enable/disable related channels carrying the PWM waveforms. The current sensor 10 is shown as a shunt resistor, however, it can be any device capable of sensing current and providing the switch driver 11 with its necessary input signal, as described hereafter. Current sensor 10 converts the current passing through it to a voltage and provides the voltage to the switch driver 11. Switch driver 11 is shown as a high side N channel MOSFET driver with current limit function, but is not so limited. Switch driver 11 can turn the main switch on and off depending on the magnitude of the current sensor signal.

The main switches and loads 2 comprise switch components, such as power MOSFETs 8, and a load 12, or loads, such as an automotive tungsten filament lamp. The switches turn power ON and OFF to the load in accordance with the waveform signals provided by the microcontroller 9.

During the start-up period of the load, for example, the period of time when the energy is first applied to the load from an OFF condition until the time when the load has reached a stable operating condition, Current control circuit 4 masks the regular PWM signals, controls the current flowing to the driver to be within a predetermined range, detects the current and compares the detected current to a predetermined current threshold to determine whether the stable load operating condition has been reached, thus ending the start-up period. Current control circuit 4 comprises a PWM masker 5, a start-up time detector 6 and a start-up time limit device 7.

The PWM masker 5 is a logical OR operable device. However, it is not necessarily limited to an OR gate. A skilled artisan would understand ho w to use alternative circuit comprises a monostable multivibrator U2A, a resistor R19 and a capacitor C2. The electric time constant established by R19 and C2 determines a delay time that is longer than the time it takes for the load current to switch from a preset current threshold. The start-up time limit device 7 comprises a monostable multivibrator U2B, a resistor R20 and a capacitor C3. The electric time constant established by R20 and C3 determines a start-up animate time. The start-up limit device enables the start-up detector 6 operation in the animate time, then disables the start-up time detector 6 operation during the steady operating condition.

Figure 2:
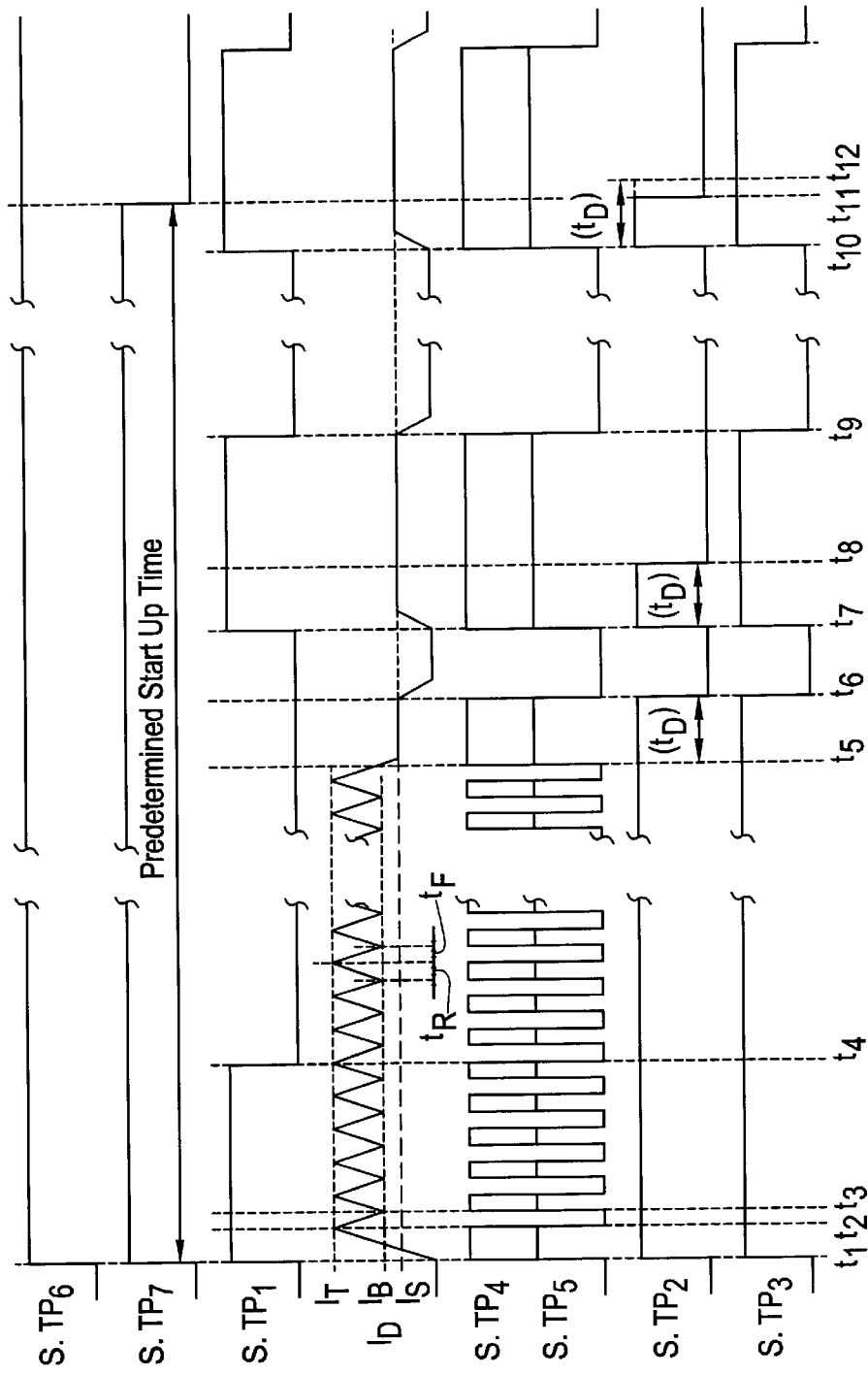
FIG. 2 is a timing diagram illustrating the respective timing of signals associated with the circuit components of FIG. 1.

The following is a description of the operation of the circuit shown in FIG. 1 and how the timing diagram shown in FIG. 2 corresponds to the signals shown in FIG. 1. Referring to FIGS. 1 and 2, at some point in time, prior to $t_1$, CH. EN., the signal at test point $TP_6$ (S.TP$_6$), goes high, i.e., it becomes "active." On the rising edge of S.TP$_6$, the monostable multivibrator U2B is triggered. As a result, the signal at test point 7 (S.TP$_7$) goes high, making another monostable multivibrator U2A exit out of RESET state. At time $t_1$, the signal at test point 1 (S.TP$_1$) goes high, thus starting a PWM pulse, shown in FIG. 2 by the rising edge of signal S.TP$_1$, at time $t_1$. S.TP$_1$ is presented to one of the inputs of logic OR gate U3A and, thus, creates the signal S.TP$_3$ at the output of U3A. S.TP$_3$ is input to a MOSFET driver $U_1$ that creates an output signal shown on test point 4 (S.TP$_4$). At the rising edge of signal S.TP$_4$, main switch 8 is turned ON and current is permitted to flow through the switch. Main switch 8 is shown in FIG. 1 to be a power MOSFET, but can be any suitable switch device that permits energy in the form of current and/or voltage to be created at its output.

The FET drain current ID begins to rise due to parasitic inductance in the circuit. Meanwhile, the signal (S.TP$_4$) at the output of Driver U1 is presented to level shifter circuit 3, shown in FIG. 1, for example, as a circuit comprising resistors R1 and R11 and a Zener diode D1. The resulting signal, at test point 5 (S.TP$_5$), is a TTL level signal which triggers monostable multivibrator U2A, making the signal at test point 2 (S.TP$_2$) go high, thereby masking the signal at test point 1 (S.TP$_1$).

At time $t_2$, current ID reaches a predetermined maximum level, current limit $I_T$. At the same time, the current limit function that is internal to driver U1 forces S.TP$_4$ and, hence, S.TP$_5$, to go low, regardless of the state of S.TP$_3$. The low level of S.TP$_4$ turns off main switch 8 and current $I_D$ begins to fall smoothly due to parasitic inductance.

At time $t_3$, before monostable multivibrator U2A returns to a stable state (illustrated by a low level on S.TP$_2$), the current $I_D$ reaches a predetermined minimum current limit $I_B$. The current limit function internal to driver U1 makes S.TP$_4$ and S.TP$_5$ go high again while S.TP$_3$ also remains high. On the rising edge of S.TP$_4$ and S.TP$_5$, monostable multivibrator U2A is re-triggered. The re-triggering of U2A keeps S.TP$_2$ in a high state for a predetermined delay time $t_D$. From $t_3$ to $t_5$, because of the start-up inrush current, characteristic of tungsten lamps, for example, $I_D$ can always reach $I_T$ each time main switch 8 is turned on. Therefore, as the current $I_D$ fluctuates back and forth between $I_B$ and $I_T$, the signal at test point 5 (S.TP$_5$) pulses, or chops, and triggers U2A repeatedly. The repeated triggering of U2A keeps S.TP$_2$ high until time $t_5$, provided $t_D$ is greater than $t_R+t_F$; where $t_R$ is the rise time of $I_D$, or the time it takes for $I_D$ to go from $I_B$ to $I_T$, and $t_F$ is the fall time of $I_D$, or the time it takes for $I_D$ to go from $I_T$ to $I_B$. To simplify the analysis, even though it is not necessarily the case, one can assume that $t_R=t_F$ and that $t_R/t_F$ equals $(I_T-I_B)$ divided by the rate of change of the current in the circuit. This relationship is illustrated in equation 1 below.

$$\left(\frac{dI_D}{dt}\right)\left(t_R = t_F = \left|\frac{I_T - I_B}{\frac{dI_D}{dt}}\right|\right) \quad \text{(equation 1)}$$

Because S.TP$_2$ remains high prior to t$_5$, the regular PWM signal, S.TP$_1$, is masked by the OR gate 5 and S.TP$_3$ stays high due to S.TP$_2$ remaining high. In other words, from t$_1$ to t$_5$, Current control circuit 4 controls the main switch's ON and OFF states using the built-in current limit function of MOSFET driver U1. Accordingly, the circuit works as a current source, which supplies waved current to the load.

At time t$_5$, the current I$_D$ falls below the lower limit I$_B$. Further, because S.TP$_3$ remains high, the MOSFET driver U1 will make S.TP$_4$ and S.TP$_5$ go high, turning on the main switch 8 and re-triggering U2A. Due to the filament resistance increasing as the filament temperature rises, the power supply reaches a point where it cannot provide enough inrush current to the filament, due to the hot resistance (R$_{HOT}$) at the set voltage. The current I$_D$ continues to drop until it reaches a steady current I$_s$, where I$_s$=V$_{PS}$/R$_{HOT}$; where V$_{PS}$ is the power supply voltage. Because I$_D$ cannot reach the top current limit I$_T$, S.TP$_4$ and S.TP$_5$ stop pulsing, or chopping. U2A then leaves the temporary stable state when the predetermined delay time t$_D$ has lapsed after the last triggering at t$_5$.

At time t$_6$, the predetermined delay time t$_D$ has elapsed. Therefore, S.TP$_2$ goes low releasing the masked regular PWM signal S.TP$_1$, signifying the completion of the start-up period. From this point forward, the PWM controller regains control of the drive signals and the main switches are driven in accordance with the PWM signals developed by the microcontroller.

At time t$_7$, S.TP$_1$ goes high in accordance with a predetermined duty cycle. On the rising edge of S.TP$_1$, the monostable multivibrator U2A is triggered, thus, making S.TP$_2$ go high. Due to the current (I$_D$), flowing in the main switch 8, being equal to the steady state current, I$_s$, S.TP$_4$ and S.TP$_5$ follow S.TP$_1$ without chopping and no pulses are generated that retrigger U2A. S.TP$_2$ goes low when time delay t$_D$ has elapsed and because the time delay t$_D$ is short, relative to the predetermined PWM duty cycle, it has no effect on the regular PWM signal S.TP$_1$. S.TP$_4$ follows a regular PWM duty cycle, from t$_7$ on, until the predetermined start-up time has elapsed.

By the time t$_{11}$ has been reached, the predetermined start-up time has elapsed and the monostable multivibrator U2B goes back to a stable state. When S.TP$_7$ goes low, U2A goes into RESET state once again until the channel enable signal (CH.EN) is activated again. The RESET condition of U2A forces S.TP$_2$ low regardless of its present state and U2A is thus prevented from masking regular control signal from the microcontroller.

Additionally, when the PWM controller detects a short circuit, by whatever means available, it provides a SHORT signal (S.TP$_8$, active low) to one of the two inputs of an AND gate U4A. The low S.TP$_8$ will reset U2A immediately to clear the mask signal S.TP$_2$ in any case and return control to the PWM controller.

What is claimed is:

1. A control device operable to control the amount of current supplied to a load, said control device comprising:
   a controller operable to receive input voltage signals and generate a PWM output signal in accordance with a predetermined duty-cycle;
   a current control device operable to receive said PWM output signal and generate a driver input signal, wherein said current control device comprises;
      a start-up detector operable to determine when a start-up time for said load has elapsed; and
      a start-up time limit device operable to set a start-up animate time and maintain the start-up detector in an operable state until said start-up animate time has elapsed;
   a driver operable to receive said driver input signal and output a driver output signal, wherein said driver output signal is a modified version of said driver input signal; and
   a switch device connected to said driver operable to receive said driver output signal and supply energy to said load in accordance with said driver output signal.

2. A control device in accordance with claim 1 further comprising a current sensor operable to sense an amount of current drawn by the load.

3. A control device in accordance with claim 2, wherein said current sensor generates a voltage based on said amount of current and supplies said voltage to said driver.

4. A control device in accordance with claim 1 wherein said current control device further comprises a PWM mask device operable to receive at its input both the PWM output signal and an output signal from the start-up time detector and, wherein said PWM mask device produces said driver input signal.

5. A control device in accordance with claim 4 wherein said PWM mask device is a logic OR gate.

6. A control device in accordance with claim 1 wherein said start-up time detector and said start-up time limit device comprise a monostable multivibrator.

7. A control device in accordance with claim 1 wherein said switch device comprises a transistor.

8. A control device in accordance with claim 2 wherein said current drawn by the load is maintained to be within a preset range until the start-up time for said load has elapsed.

9. A control device in accordance with claim 1 wherein said load is a tungsten filament lamp.

10. A control device in accordance with claim 1 wherein said load is a DC motor.

11. A control device in accordance with claim 1 wherein said start-up animate time is longer than the start-up time for said load.

12. A current control means for controlling the electrical current drawn by a load, comprising:
   a microcontroller generating a pulse-width modulated output signal;
   a current control means receiving said pulse-width modulated output signal, said current control means determining whether a start-up time for said load has elapsed and providing a driver circuit with a first driver input signal if said start-up time has elapsed and providing the driver circuit with a second driver input signal, different than said first driver input signal, if said start-up time has not elapsed, the second driver input signal maintaining a current drawn by the load to be within a preset current range,
   wherein said driver circuit provides a switch control signal to a switch such that the switch is turned on and off repeatedly in accordance with said first and second driver input signals.

13. A current control means in accordance with claim 12 wherein said first driver input signal has the same duty-cycle as said pulse-width modulated output signal.

14. A current control means in accordance with claim 12, further comprising a current sensor for determining the amount of electrical current drawn by said load and providing said driver with a sensed current result.

15. A current control means in accordance with claim 13, wherein said driver produces a pulsed waveform which is synchronous with the sensed current result as the value of the sensed current result changes between a minimum current value and a maximum current value within a preset range.

16. A method for controlling drive signals supplied to a load, said method comprising:

detecting a beginning and an end of a start-up period, wherein the beginning of the start-up period occurs at a time when said drive signal is first applied to the load from an off condition and the end of the start-up period occurs when the load has reached a stable operating condition;

after the beginning of the start-up period and before the end of the start-up period, supplying said load with a variable frequency drive signal based on a measured value of an electrical current being drawn by said load, wherein the magnitude of said electrical current fluctuates between a high threshold limit and a low threshold limit;

after the end of the start-up period, supplying said load with a drive signal that has a constant frequency.

17. A method for controlling drive signals supplied to a load, said method comprising:

providing a variable frequency drive signal to said load during a start-up period of said load; and providing a fixed frequency drive signal to said load after said start-up period has ended, wherein said start-up period is determined based on an amount of electrical current drawn by said load.

18. A method as claimed in claim 17 further comprising:

controlling said electrical current drawn by said load to remain within a predetermined range.

* * * * *